US011042453B2

(12) United States Patent
Won et al.

(10) Patent No.: US 11,042,453 B2
(45) Date of Patent: Jun. 22, 2021

(54) DATABASE JOURNALING METHOD AND APPARATUS

(71) Applicants: IUCF-HYU(Industry-University Cooperation Foundation Hanyang University), Seoul (KR); UNIST(ULSAN NATIONAL INSTITUTE OF SCIENCE AND TECHNOLOGY), Ulsan (KR)

(72) Inventors: You Jip Won, Seongnam (KR); Beom Seok Nam, Ulsan (KR)

(73) Assignees: IUCF-HYU(Industry-University Cooperation Foundation Hanyang University), Seoul (KR); UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 724 days.

(21) Appl. No.: 15/372,310

(22) Filed: Dec. 7, 2016

(65) Prior Publication Data

US 2017/0293536 A1    Oct. 12, 2017

(30) Foreign Application Priority Data

Apr. 6, 2016    (KR) .................. 10-2016-0042142

(51) Int. Cl.
*G06F 11/14*    (2006.01)
*G06F 16/23*    (2019.01)
*G06F 16/18*    (2019.01)

(52) U.S. Cl.
CPC .......... *G06F 11/1471* (2013.01); *G06F 11/14* (2013.01); *G06F 11/1446* (2013.01);
(Continued)

(58) Field of Classification Search
CPC .................................................. G06F 11/1471
See application file for complete search history.

(56) References Cited

U.S. PATENT DOCUMENTS

2012/0072723 A1\* 3/2012 Orsini ................. G06F 21/6209
                                                    713/165
2016/0085839 A1\* 3/2016 D'Halluin ............. G06F 16/278
                                                    707/747
(Continued)

FOREIGN PATENT DOCUMENTS

| JP | 08-036513 A | 2/1996 |
|---|---|---|
| KR | 10-0501414 B1 | 7/2005 |
| KR | 10-0725415 B1 | 6/2007 |

OTHER PUBLICATIONS

SQLite, "The SQLite Database File Format", Mar. 25, 2015 (Year: 2015).\*

(Continued)

*Primary Examiner* — Dawaune A Conyers
(74) *Attorney, Agent, or Firm* — Novick, Kim & Lee, PLLC; Sang Ho Lee (57) ABSTRACT

Provided is a database journaling method and apparatus for storing a log file in a storing apparatus by performing a lesser number of record commands to decrease a volume of data to be input and output by the storing apparatus, and the database journaling method may include determining whether a database is changed based on an operation performed on data in the database, generating a log file including log entries for the database when the database is changed, and performing journaling on the database by storing the generated log file in a storing apparatus, wherein each of the log entries includes a log record in which the data associated with a change of the database is stored, and metadata for the log record is recorded in a predetermined area embedded in the log record.

11 Claims, 2 Drawing Sheets

(52) U.S. Cl.
CPC ...... *G06F 16/1815* (2019.01); *G06F 16/2358* (2019.01); *G06F 2201/80* (2013.01)

(56) References Cited

U.S. PATENT DOCUMENTS

2016/0217177 A1* 7/2016 Niikura ............... G06F 16/2358
2016/0350302 A1* 12/2016 Lakshman .......... G06F 16/9014
2017/0083540 A1* 3/2017 Mamluk ............. G06F 11/1471

OTHER PUBLICATIONS

Kim et al., "NVWAL: Exploiting NVRAM in Write-Ahead Logging", Mar. 2016 (Year: 2016).*
W. Lee et al., "WALDIO: Eliminating the Filesystem Journaling in Resolving the Journaling of Journal Anomaly", Proceedings of the 2015 USENIX Annual Technical Conference (USENIC ATC '15), Jul. 8-10, 2015, pp. 235-247, Santa Clara, CA, USA.
Sang-Young Cho, "A Journaling Method for FAT File System to Improve Reliability of Movable Storage Media", Journal of Security Engineering, Dec. 3, 2013, vol. 10, No. 6, pp. 711-722.
Taehoon Kim et al., "Design of a Log Structure for Fast Recovery of a File System on NAND Flash Memory", Pusan National University, vol. 32, No. 2(I), pp. 784-786.

* cited by examiner

DATABASE JOURNALING METHOD AND APPARATUS

CROSS-REFERENCE TO RELATED APPLICATION(S)

This application claims the priority benefit of Korean Patent Application No. 10-2016-0042142 filed on Apr. 6, 2016, in the Korean Intellectual Property Office, the disclosure of which is incorporated herein by reference for all purposes.

BACKGROUND

1. Field

One or more example embodiments relate to a database journaling method and apparatus.

2. Description of Related Art

Journaling or logging indicates an operation of storing, in another storing apparatus, data associated with operations of performing adding, deleting, or updating in order to be able to recover data if necessary when data is added to or deleted from a database or when data in a database is updated. A journaling mode includes (i) a rollback journaling mode in which journaling is performed on data obtained before a database is changed and the data obtained after the database is changed is stored, and (ii) a rollforward journaling mode in which journaling is performed on the data obtained after the database is changed before the data obtained after the database is changed is stored.

A method of storing the data on which the journaling is performed in a file is referred to as a file based journaling method. The file in which the data is stored is referred to as a log file. The log file includes an area (log record) in which the data is recorded and an area in which metadata for a log record is recorded.

When the log file is stored in a storing apparatus, the log file uses a record command included in a system call. One record command may be to perform a writing operation which makes the log file 4 kilobytes in size. When the log record is 4 kilobytes in size, at least two record commands may be performed in order to record a piece of data on which journaling is performed and thus, a volume of data increases.

SUMMARY

An aspect provides a database journaling method and apparatus for storing a log file in a storing apparatus by performing a lesser number of record commands to decrease a volume of data to be input and output by the storing apparatus.

According to an aspect, there is provided a database journaling method and a non-transitory computer-readable storage medium storing a program to implement the database journaling method including determining whether a database is changed based on an operation performed on data in the database, generating a log file including log entries for the database when the database is changed, and performing journaling on the database by storing the generated log file in a storing apparatus, wherein each of the log entries includes a log record in which the data associated with a change of the database is stored, and metadata for the log record is recorded in a predetermined area embedded in the log record.

When a journaling mode of the database is a rollback journaling mode, the predetermined area may include a header area including a page number for the log record and a footer area including a checksum for at least one piece of the data stored in the log record, and the data obtained before the database is changed is recorded in the log record.

A size of the predetermined area may be determined based on a sum of a size of the header area and a size of the footer area.

When a journaling mode of the database is a rollforward journaling mode, the predetermined area may include a frame header area including a checksum for the log record, and the data obtained after the database is changed is recorded in the log record.

A size of the predetermined area may be identical to a size of the frame header area.

The predetermined area may be set to be at least at one of an end portion, a start portion, and a middle portion of the log record.

The database journaling method and the non-transitory computer-readable storage medium storing a program to implement the database journaling method may respectively further include performing and store an instruction to perform journaling on the log file in the storing apparatus using a record command corresponding to each of the log entries.

The database may include a plurality of nodes on which the data is recorded, and the data is added to a node of which a size of an available space is greater than or equal to a size of the predetermined area, from among the nodes.

The database may include a node on which the data is recorded, and the node is split such that a size of an available space of each of nodes generated by splitting the node is greater than or equal to a size of the predetermined area.

The database may include a plurality of nodes on which the data is recorded, and the nodes are merged such that a size of an available space of a node generated by merging the nodes is greater than or equal to a size of the predetermined area.

According to another aspect, there is provided a database journaling apparatus including a processor, wherein the processor is configured to determine whether a database is changed based on an operation performed on data in the database, generate a log file including log entries for the database when the database is changed, perform journaling on the database by storing the generated log file in a storing apparatus, and each of the log entries includes a log record in which the data associated with a change of the database is stored, and metadata for the log record is recorded in a predetermined area embedded in the log record.

When a journaling mode of the database is a rollback journaling mode, the processor may be configured to allocate, to the predetermined area, a header area including a page number for the log record and a footer area including a checksum for at least one piece of the data stored in the log record, and the data obtained before the database is changed is recorded in the log record.

When a journaling mode of the database is a rollforward journaling mode, the processor may be configured to allocate, to the predetermined area, a frame header area including a checksum for the log record, and the data obtained after the database is changed is recorded in the log record.

The database may include a plurality of nodes on which the data is recorded, and the processor is configured to add the data to a node of which a size of an available space is greater than or equal to a size of the predetermined area from among the nodes when the data is added to any one of the nodes.

The database may include a node on which the data is recorded, and the processor is configured to split the node such that a size of an available space of each of nodes generated by splitting the node is greater than or equal to a size of the predetermined area.

The database may include a plurality of nodes on which the data is recorded, and the processor is configured to merge the nodes such that a size of an available space of a node generated by merging the nodes is greater than or equal to a size of the predetermined area.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Specific structural or functional descriptions relating to the examples are proposed only for the examples. Thus, various modifications may be made to the examples. The examples are not provided to be limiting of the disclosure and should be understood to include all the changes, alterations, equivalents, and replacements thereof.

Although the terms "first", "second", etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

The terminology used herein is for the purpose of describing particular examples only and is not intended to be limiting of the disclosure. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, examples will be described with reference to the accompanying drawings in which like reference numerals refer to like constituent elements throughout.

Figure 1:
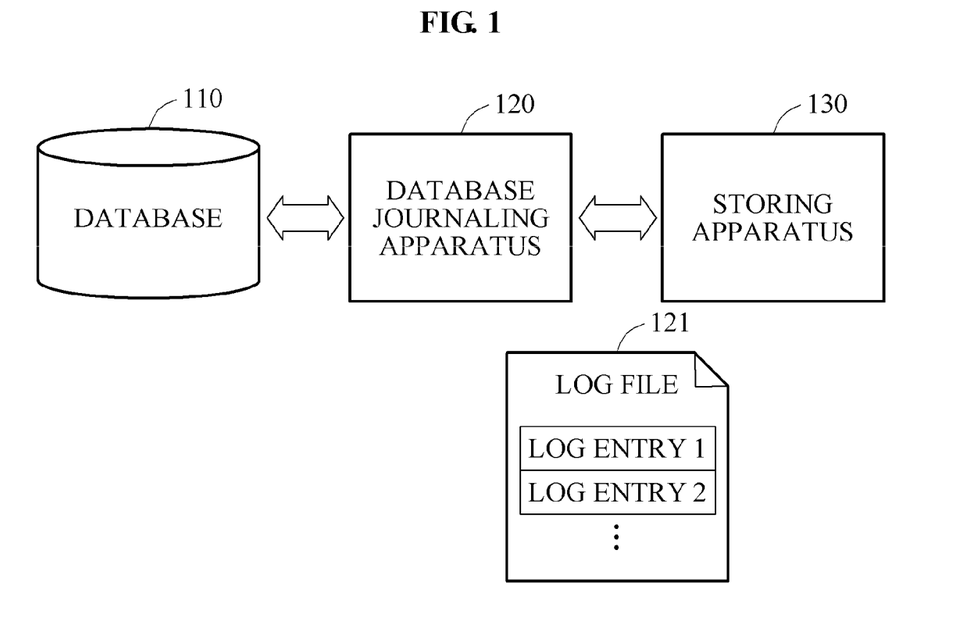
FIG. 1 is a block diagram illustrating a system including a database journaling apparatus according to an example embodiment.

FIG. 1 is a block diagram illustrating a system including a database journaling apparatus 120 according to an example embodiment.

Referring to FIG. 1, the database journaling apparatus 120 may communicate with a database 110 and a storing apparatus 130. The database journaling apparatus 120 may be connected to the database 110 and the storing apparatus 130 via a bus, or other wired or wireless communication devices.

The database 110 indicates a system that manages a set of pieces of data to be used or shared by at least one user. The database 110 may be at least one of MySQL, Oracle, MongoDB, REmote DIctionary System (Redis) or SQLite. The data in the database 110 may be managed in a node unit. The database 110 may include at least one node on which the data is recorded.

Hereinafter, an operation indicates all operations that cause a change of the data in the database 110, for example, adding the data to the database 110, deleting the data from the database 110, or updating the data in the database 110. When the operation is performed, an operation of storing, in another storing apparatus, data associated with the change in the database 110 due to the operation being performed in order to recover the database 110 is referred to as journaling or logging.

The database journaling apparatus 120 generates a log file 121 by extracting the data associated with the change in the database 110 from the pieces of data in the database 110, in order to perform journaling on the database 110. The database journaling apparatus 120 may include a processor configured to execute a program that uses a database journaling method in order to generate the log file 121. Although FIG. 1 illustrates that the database 110 and the database journaling apparatus 120 are separated, the database 110 and the database journaling apparatus 120 may be provided in a single processor.

Referring to FIG. 1, the log file 121 may include log entries for at least one database. When the operation is performed in the database 110, the database journaling apparatus 120 may extract the data associated with the operation and record the data in the log entries. The database journaling apparatus 120 may record the extracted data in a log record included in each of the log entries. Further, the database journaling apparatus 120 may record metadata for the log record in a predetermined area embedded in the log record. The database journaling apparatus 120 may allocate the predetermined area in which the metadata is recorded within the log record. Thus, the database journaling apparatus 120 may store the log file 121 in the storing apparatus 130 using at least one record command for each log entry.

The database journaling apparatus 120 may determine which piece of data is to be recorded in the log entries based on a journaling mode.

For example, when the journaling mode is set to be a rollback journaling mode, the database journaling apparatus 120 may record unchanged data in each of the log entries. When the operation is incompletely performed in the database 110, the database 110 may undo the operation using the unchanged data included in the log file 121. Hereinafter, the term unchanged data indicates data obtained before being changed due to the operation.

When the journaling mode is set to be a rollforward journaling mode, the database journaling apparatus 120 may record changed data in each of the log entries. The log file 121 may be stored in the storing apparatus 130 before the operation is performed. Thus, when the operation is incompletely performed in the database 110, the database 110 may redo to the operation using the changed data included in the log file. Hereinafter, the term changed data indicates data obtained after being changed due to the operation.

Referring to FIG. 1, the database journaling apparatus 120 performs journaling on the data by storing the generated log file 121 in the storing apparatus 130. The storing apparatus 130 may be a device or a medium that stores the data. For example, the storing apparatus 130 may be a hard disk drive (HDD), a solid state drive (SSD), a flash memory, or an embedded multi-media card (eMMC). The log file 121 and the data included in the database 120 may be recorded in the storing apparatus 130.

In an example, the operation performed on the data in the database 110 may be performed based on a size of the predetermined area embedded in the log record. For example, the database journaling apparatus 120 may add the data to a node of the database 110 based on the size of the predetermined area. In detail, when the data is added to a corresponding node and a size of an available space of the corresponding node is less than or equal to the size of the predetermined area, the database journaling apparatus 120 may add the data to another node other than the corresponding node. The database journaling apparatus 120 may add the data to a node of which the size of the available space is greater than or equal to the size of the predetermined area from among a plurality of nodes included in the database 110. Thus, the log record and the nodes of the database 110 may be aligned.

When the size of the available space of the node is less than or equal to the size of the predetermined area, the database journaling apparatus 120 may move all the data or a portion of the data recorded in the node to at least one other node. That is, the database journaling apparatus 120 may split one node into at least two nodes based on the size of the available space of the node.

The database journaling apparatus 120 may split the node based on the log record corresponding to the node. The database journaling apparatus 120 may split the node such that the size of the available space of each of nodes generated by splitting the node is greater than or equal to the size of the predetermined area. Thus, the database journaling apparatus 120 may split the node based on the size of the predetermined area embedded in the log record. Because the size of the available space of each of the nodes generated by splitting the node is greater than or equal to the size of the predetermined area, the database journaling apparatus 120 may embed the predetermined area in the log records corresponding to the split nodes.

The database journaling apparatus 120 may move, to one node, the data recorded in the nodes of which sizes of available spaces are greater than or equal to the size of the predetermined area. Thus, the database journaling apparatus 120 may allow the nodes to be merged into one node based on the sizes of the available spaces of the nodes.

The database journaling apparatus 120 may merge the nodes such that the size of the available space of the node generated by merging the nodes is greater than or equal to the size of the predetermined area. Thus, the database journaling apparatus 120 may merge the nodes based on the size of the predetermined area embedded in the log record. Because the size of the available space of the node generated by merging the nodes is greater than or equal to the size of the predetermined area, the database journaling apparatus 120 may embed the predetermined area in the log record corresponding to the merged node.

Thus, the available space of the node of the database 110 may be maintained to be greater than or equal to the size of the predetermined area. As a result, when the journaling is performed, the database journaling apparatus 120 may embed the predetermined area in lieu of correcting the data of the log record corresponding to the node. Accordingly, the database journaling apparatus 120 may perform journaling relatively quickly.

Figure 2:
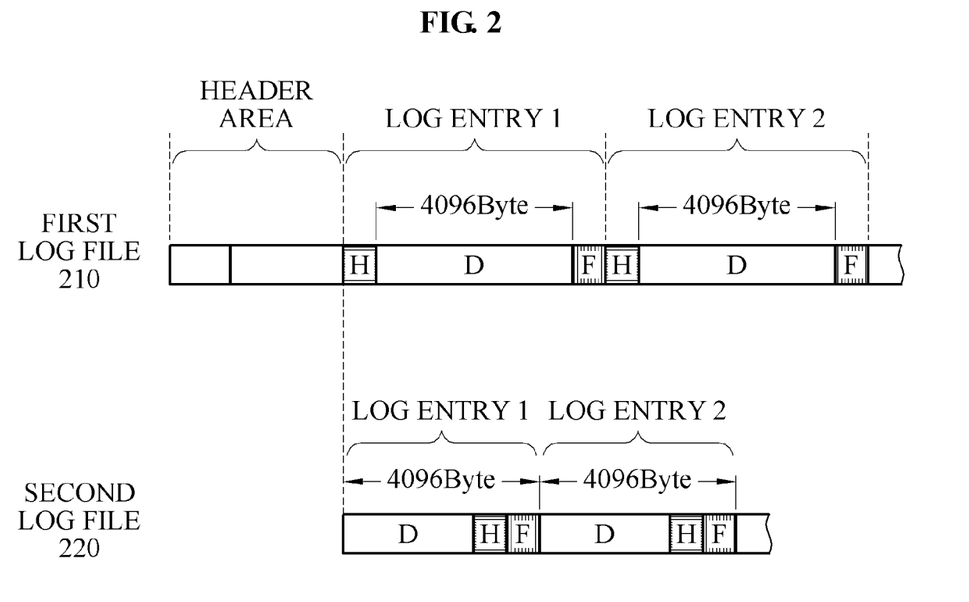
FIG. 2 illustrates a structure of a log file generated by a database journaling apparatus using a rollback journaling mode according to an example embodiment.

FIG. 2 illustrates a structure of a log file generated by a database journaling apparatus using a rollback journaling mode according to an example embodiment. FIG. 2 illustrates a comparison between a structure of a first log file 210 generated by a database journaling apparatus according to related art and a structure of a second log file 220 generated by a database journaling apparatus according to an example embodiment.

Referring to FIG. 2, the first log file 210 includes a header area in which metadata for the first log file 210 is recorded. Because header areas of the first log file 210 and the second log file 220 may have similar structures, repeated descriptions will be omitted for increased clarity and conciseness.

Referring to FIG. 2, the first log file 210 includes at least one log entry. In FIG. 2, a log entry 1 and a log entry 2 are illustrated for simplicity. In a rollback journaling mode, the log entry may include data obtained before a database is changed due to an operation.

In FIG. 2, the log entry of the first log file 210 includes a header area indicated by H and a footer area indicated by F in respective areas other than an area of a log record indicated by D. A size of the log record of the first log file 210 may be identical to a size of a node of the database. For example, when the database uses a B-tree structure, the size of the log record may be 4 kilobytes (4096 bytes). In this example, each size of the header area and the footer area of the first log file 210 may be 4 bytes. Thus, the size of the log entry may be aligned based on a size of a sector. Thus, a plurality of record commands is used to record the log entry in a storing apparatus. The storing apparatus may perform a plurality of unnecessary input and output operations such that the life of the storing apparatus may decrease.

Referring to FIG. 2, the log file 220 generated by the database journaling apparatus includes at least one log entry. The log entry includes a log record in which data associated with a change of a database is stored.

Because a journaling mode of the database journaling apparatus is a rollback journaling mode, the log entry may include the data obtained before the database is changed due to an operation. Thus, when the operation abnormally terminates, the database may recover the data obtained before the operation is performed based on the log entry. The database may undo the operation that abnormally terminates.

The log entry of the second log file 220 may include a log record in which the data associated with the change of the database is stored. Because the journaling mode of the database journaling apparatus is the rollback journaling mode, the data obtained before the database is changed due to the operation may be recorded in the log record. The database journaling apparatus may use a predetermined area in the log record to record metadata for the log record. The metadata for the log record may include a number of nodes included in the log record, a page number of the log record, a checksum for the entire log record or a portion of the log record, and a parity value and a hash value of the entire log record or the portion of the log record.

Referring to FIG. 2, the database journaling apparatus may set the header area and the footer area in the log record. The database journaling apparatus may record the metadata for the log record in the header area and the footer area. For example, the database journaling apparatus may record the page number of the log record in the header area. The database journaling apparatus may record the checksum for all the data or a portion of the data recorded in the log record in the footer area.

In the second log file 220 of FIG. 2, the header area and the footer area are allocated to an end portion of the log record. In an example, the database journaling apparatus may allocate the header area and the footer area to a start portion of the log record. The database journaling apparatus may also allocate the header area and the footer area to a middle portion of the log record. Further, the database journaling apparatus may allocate the header area and the footer area each to separate areas in the log record. Thus, the database journaling apparatus may record the metadata for the log record in at least one predetermined area allocated to the log record. The database journaling apparatus may include the predetermined area in the log record.

In an example, the database journaling apparatus may set a size of the log entry to be identical to a size of a node. The database journaling apparatus may set the size of the log entry to be identical to a size of a page of the database. For the database that uses the B-tree structure, the database journaling apparatus may set the size of the log entry to be 4 kilobytes to correspond to the size of the node. As described above, because the metadata for the log record is recorded in the predetermined area in the log entry, a size of an area in which the data obtained before the database is changed is recorded may be less than 4 kilobytes.

However, when the size of the log entry is set to be 4 kilobytes, the size of the log entry may be aligned based on the size of the sector. Thus, the database journaling apparatus may store the log entry based on a single record command only. In addition, a number of unnecessary input and output operations performed by the storing apparatus may decrease such that the life of the storing apparatus may increase.

For example, the database journaling apparatus may process the data based on a size of the header area and a size of the footer area embedded in the log entry. The database journaling apparatus may record the data on the node based on a size of an area in which the data is recorded in the log entry.

Also, the database journaling apparatus may split a node into a plurality of nodes or merge a plurality of nodes into a node based on the size of the header area and the size of the footer area. The database journaling apparatus may split the node such that a size of an available space of each of the nodes generated by splitting the node is greater than or equal to a sum of the size of the header area and the size of the footer area. The database journaling apparatus may merge the nodes such that the size of the available space of the node generated by merging the nodes is greater than or equal to the sum of the size of the header area and the size of the footer area. Thus, the database journaling apparatus may store the data for the single node in the single log entry.

Thus, the size of the available space of the node of the database may be maintained to be greater than or equal to the sum of the size of the header area and the size of the footer area. As a result, the database journaling apparatus may embed the header area and the footer area in the log record in lieu of correcting the data of the log record corresponding to the node when the journaling is performed.

Figure 3:
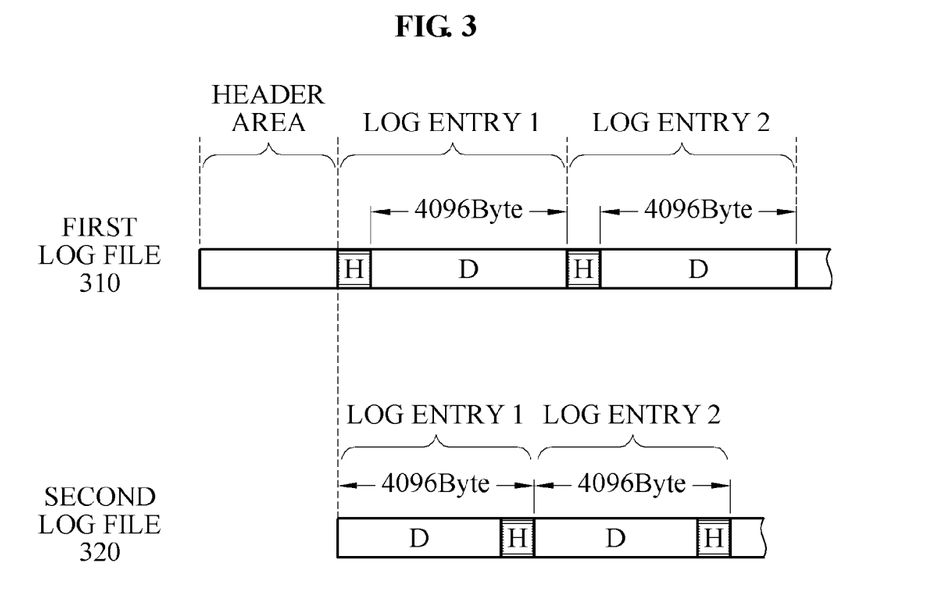
FIG. 3 illustrates a structure of a log file generated by a database journaling apparatus using a rollforward journaling mode according to an example embodiment.

FIG. 3 illustrates a structure of a log file generated by a database journaling apparatus operating in a rollforward journaling mode according to an example embodiment. FIG. 3 illustrates a comparison between a structure of a first log file 310 generated by a database journaling apparatus according to related art and a structure of a second log file 320 generated by a database journaling apparatus according to an example embodiment. The description of the structure of the first log file 310 and the structure of the second log file 320 will be provided, but repeated descriptions provided with reference to FIG. 2 will be omitted for increased clarity and conciseness.

Referring to FIG. 3, the first log file 310 includes a header area in which metadata for the first log file 310 is recorded. As described above with reference to FIG. 2, the second log file 320 generated by the database journaling apparatus according to an example embodiment also includes a header area having a similar structure to that of the header area of the first log file 310.

Referring to FIG. 3, the first log file 310 includes at least one log entry. In FIG. 3, a log entry 1 and a log entry 2 are illustrated for simplicity. In the rollforward journaling mode, the log entry includes data obtained after a database is changed due to an operation.

In FIG. 3, the log entry of the first log file 310 includes a frame header area indicated by H and a log record indicated by D. A size of the log record of the first log file 310 may be identical to a size of a node of the database. Thus, a size of the log entry may not be aligned based on a size of a sector. Thus, a plurality of record commands is used to record the log entry in a storing apparatus. The storing apparatus may perform a plurality of unnecessary input and output operations such that the life of the storing apparatus may decrease.

Referring to FIG. 3, the second log file 320 generated by the database journaling apparatus includes at least one log entry. The log entry includes a log record in which data associated with a change of the database is stored.

Because a journaling mode of the database journaling apparatus is a rollforward journaling mode, the log entry may include the data obtained after the database is changed due to an operation. The log entry may be stored before the data in the database is changed. Thus, when the operation abnormally terminates, the database may redo the abnormally terminated operation based on the log entry. The database may complete the abnormally terminated operation.

The log entry of the second log file 320 may include the log record in which the data associated with the change of the database is stored. The database journaling apparatus may record the data obtained after the database is changed due to the operation in the log record. The database journaling apparatus may use a predetermined area in the log record to record metadata for the log record.

Referring to FIG. 3, the database journaling apparatus may set the frame header area in the log entry. The database journaling apparatus may record the metadata for the log record in the set frame header area. For example, the database journaling apparatus may record, in the frame header area, a checksum for all the data or a portion of the data. In addition, the database journaling apparatus may record, in the frame header area, at least one of a number of nodes included in the log record, a page number of the log record, or a parity value and a hash value of all the data or the portion of the data.

In the second log file 320 of FIG. 3, the frame header area is allocated to an end portion of the log record, but the database journaling apparatus may also allocate the frame header area to a start portion or a middle portion of the log record. The database journaling apparatus may record the metadata for the log record in at least one predetermined area in the log record.

In an example, the database journaling apparatus may set a size of the log entry to be identical to a size of a node of the database. In the rollforward journaling mode, the database journaling apparatus may set a size of the log entry to be identical to a size of a frame. For the database that uses a B-tree structure, the database journaling apparatus may set the size of the log entry to be 4 kilobytes corresponding to the size of the node of the database. Thus, when a position at which the metadata for the log record is recorded is considered, a size of an area in which the data obtained after the database is changed is recorded may be less than 4 kilobytes.

However, when the size of the log entry is set to be 4 kilobytes, the size of the log entry may be aligned based on a size of a sector. Thus, the database journaling apparatus may store the log entry based on a single record command only. In addition, a number of unnecessary input and output operations performed by the storing apparatus may decrease such that the life of the storing apparatus may increase.

For example, the database journaling apparatus may process the data based on a size of the frame header area embedded in the log entry. The database journaling apparatus may record the data on the node based on the size of an area in which the data is recorded in the log entry.

Also, the database journaling apparatus may split a node into a plurality of nodes based on the size of the frame header area, or merge a plurality of nodes into a single node. The database journaling apparatus may split the node such that a size of an available space of each of the nodes generated by splitting the node is greater than or equal to the size of the frame header area. The database journaling apparatus may merge the nodes such that the size of the available space of the node generated by merging the nodes is greater than or equal to the size of the frame header area.

Thus, the size of the available space of the node of the database may be maintained to be greater than or equal to the size of the frame header area. As a result, the database journaling apparatus may embed the frame header area in the log record in lieu of correcting the data of the log record corresponding to the node when the journaling is performed.

Figure 4:
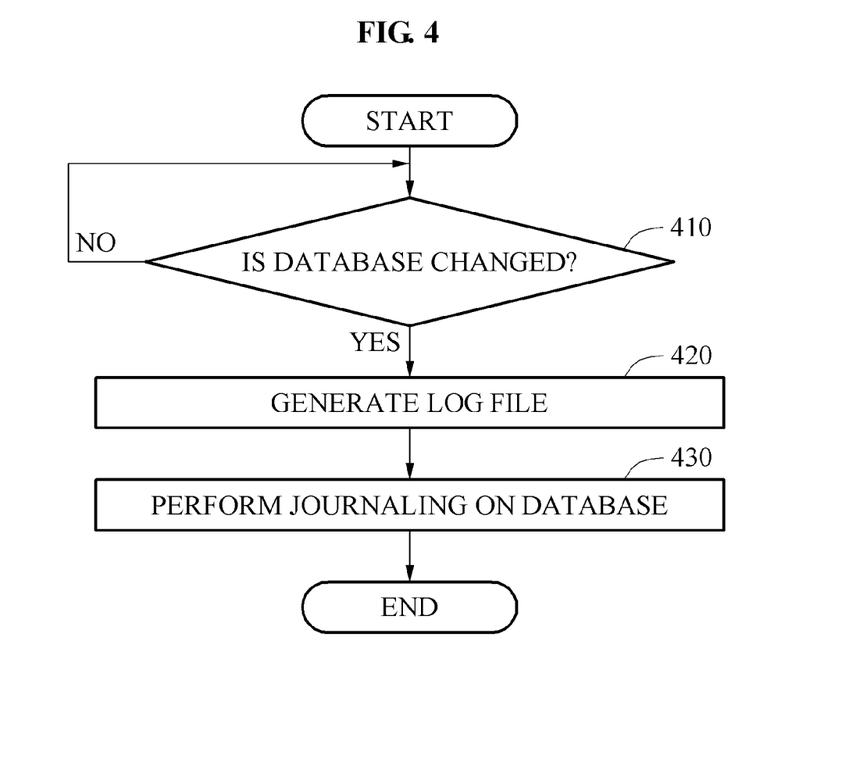
FIG. 4 is a flowchart illustrating an operation performed by a database journaling apparatus according to an example embodiment.

FIG. 4 is a flowchart illustrating an operation performed by a database journaling apparatus according to an example embodiment. A non-transitory computer-readable storage medium storing a program to implement a database journaling method may be provided. The program may include at least one of an applet, a dynamic link library (DLL), a device driver, middleware, firmware, or an application program storing the database journaling method. In an example, the database journaling apparatus includes a processor, and the processor performs the database journaling method by reading the storage medium in which the database journaling method is recorded.

Referring to FIG. 4, in operation 410, the database journaling apparatus determines whether a database is changed based on an operation performed on data in the database. The database journaling apparatus may detect whether (i) new data is added to the database, (ii) whether the data is removed from the database, or (iii) whether the data included in the database is updated.

Further, the database journaling apparatus may detect whether nodes included in the database are merged or a node included in the database is split. The database journaling apparatus may determine whether the database is changed and which piece of data is changed in the database based on a result of the detecting. The database journaling apparatus may reserve, in advance, a space required for performing journaling.

The database journaling apparatus may interpret a structured query language (SQL) command transmitted to the database in order to detect whether the database is changed. The database journaling apparatus may receive information on whether the database is changed from the database. When the database is changed, the database journaling apparatus performs operation 420.

Referring to FIG. 4, in operation 420, the database journaling apparatus generates a log file including log entries for the database. The log file includes at least one log entry. A size of the log entry may be aligned based on a size of a node of the database. For example, the size of the log entry may be determined to be within a maximum volume of the data to be recorded in a storing apparatus by one record command.

For example, the size of the log entry may be aligned based on a size of a page of the storing apparatus. The size of the page of the storing apparatus may be determined based on a block size of a file system used by the storing apparatus. Thus, the size of the log entry may be identical to the block size of the file system. For example, the size of the log entry may be aligned based on a size of a page of a negative AND (NAND) flash memory.

The log entry includes a log record in which data associated with a change of the database is stored. The database journaling apparatus may record metadata for the log record in a predetermined area embedded in the log record. The database journaling apparatus may set the predetermined area to be at least at one of a start portion, a middle portion, or an end portion of the log record. The predetermined area may be set to be at least at one of the start portion, the middle portion, or the end portion, or set to be at a plurality of portions distributed in the log record. The database journaling apparatus may reserve, in advance, a space for storing the log entry based on a size of the predetermined area.

The database journaling apparatus may determine the data stored in the log record based on a set journaling mode. The journaling mode may be controlled by a user, or dynamically controlled by the database journaling apparatus.

When the journaling mode for the database is a rollback journaling mode, the predetermined area in which metadata for the log record is recorded may include a header area including a page number for the log record and a footer area including a checksum for at least one piece of data. The database journaling apparatus may record the data obtained before the database is changed in the log record. For example, the size of the predetermined area may be determined based on a sum of a size of the header area and a size of the footer area.

When the journaling mode for the database is a rollforward journaling mode, the predetermined area in which the metadata for the log record is recorded may include a frame header area including the checksum for the log record. The database journaling apparatus may also record the data obtained after the database is changed in the log record. For example, the size of the predetermined area may be identical to a size of the frame header area.

In operation 430, the database journaling apparatus performs journaling on the database by storing the generated log file in the storing apparatus. When the journaling mode for the database is the rollforward journaling mode, the database journaling apparatus may perform operation 430 before performing an operation on the database.

The database journaling apparatus may store the log file in the storing apparatus in a log entry unit. The database journaling apparatus may use a record command included in a system call.

As described above, because the size of the log entry is determined based on a maximum volume of the data to be recorded in the storing apparatus by one record command, the size of the page of the storing apparatus, or the size of the node of the database, the database journaling apparatus may store a single log entry in the storing apparatus based on a single record command. That is, the database journaling apparatus may perform journaling on the log file in the storing apparatus using the record command corresponding to the log entry. Thus, the storing apparatus may decrease a number of unnecessary input and output operations.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a to microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A database journaling method comprising:
   determining whether a database is changed based on an operation performed on data in the database;
   generating a log file including one or more log entries for the database when the database is changed; and
   performing journaling on the database by storing the generated log file in a storing apparatus,
   wherein each of the log entries includes a log record in which data associated with a change of the database is stored, and metadata for the log record is recorded in a predetermined area allocated in the log record, wherein a size of each log entry is identical to a size of the log record included therein, wherein the database includes a plurality of nodes on which the data in the database is recorded, data is added to a node among the plurality of nodes in the database when a size of an available space of the node is greater than or equal to a size of the predetermined area allocated in the log record, and the log entries and the plurality of nodes are aligned based on a size of a page of the storing apparatus, wherein the performing journaling on the database by storing the generated log file in the storing apparatus includes:

embedding the metadata for the log record within the log record whose available space is greater than or equal to the size of the predetermined area allocated in the log record.

2. The method of claim 1, wherein, when a journaling mode of the database is a rollback journaling mode, the predetermined area includes a header area including a page number for the log record and a footer area including a checksum for at least one piece of the data stored in the log record, and the data obtained before the database is changed is recorded in the log record.

3. The method of claim 2, wherein a size of the predetermined area is determined based on a sum of a size of the header area and a size of the footer area.

4. The method of claim 1, wherein, when a journaling mode of the database is a rollforward journaling mode, the predetermined area includes a frame header area including a checksum for the log record, and the data obtained after the database is changed is recorded in the log record.

5. The method of claim 4, wherein a size of the predetermined area is identical to a size of the frame header area.

6. The method of claim 1, wherein the predetermined area is set to be at least at one of an end portion, a start portion, and a middle portion of the log record.

7. The method of claim 1, further comprising:
performing journaling on the log file in the storing apparatus using a record command corresponding to each of the log entries.

8. A database journaling apparatus comprising:
a processor,
wherein the processor is configured to determine whether a database is changed based on an operation performed on data in the database, generate a log file including one or more log entries for the database when the database is changed, and perform journaling on the database by storing the generated log file in a storing apparatus, wherein each of the log entries includes a log record in which data associated with a change of the database is stored, and metadata for the log record is recorded in a predetermined area allocated in the log record, wherein a size of each log entry is identical to a size of the log record included therein, wherein the database includes a plurality of nodes on which the data in the database is recorded, data is added to a node among the plurality of nodes in the database when a size of an available space of the node is greater than or equal to a size of the predetermined area allocated in the log record, and the log entries and the plurality of nodes are aligned based on a size of a page of the storing apparatus, wherein the processor is further configured to embed the metadata for the log record within the log record whose available space is greater than or equal to the size of the predetermined area allocated in the log record.

9. The apparatus of claim 8, wherein, when a journaling mode of the database is a rollback journaling mode, the processor is configured to allocate, to the predetermined area, a header area including a page number for the log record and a footer area including a checksum for at least one piece of the data stored in the log record, and the data obtained before the database is changed is recorded in the log record.

10. The apparatus of claim 8, wherein, when a journaling mode of the database is a rollforward journaling mode, the processor is configured to allocate, to the predetermined area, a frame header area including a checksum for the log record, and the data obtained after the database is changed is recorded in the log record.

11. A non-transitory computer-readable storage medium storing a program to implement the method of claim 1.

* * * * *